United States Patent [19]
Gorman

[11] Patent Number: 6,167,324
[45] Date of Patent: Dec. 26, 2000

[54] MACHINE TOOL MONITORING SYSTEM

[75] Inventor: Paul William Gorman, Longmeadow, Mass.

[73] Assignee: American Saw & Manufacturing Company, East Longmeadow, Mass.

[21] Appl. No.: 09/114,837

[22] Filed: Jul. 14, 1998

[51] Int. Cl.[7] .............................. G06F 15/46; D26D 5/00
[52] U.S. Cl. ........................ 700/171; 700/174; 83/76; 83/789
[58] Field of Search .................................. 700/180, 186, 700/188, 174, 160, 175, 195; 318/570, 571; 451/8; 83/72, 74, 13, 403, 800

[56] References Cited

U.S. PATENT DOCUMENTS

| | | | |
|---|---|---|---|
| 3,689,839 | 9/1972 | Cother | 324/181 |
| 3,970,830 | 7/1976 | White et al. | 318/567 |
| 4,131,837 | 12/1978 | Whetham | 318/571 |
| 4,787,049 | 11/1988 | Hirata et al. | 364/474.15 |
| 4,887,219 | 12/1989 | Strauser | 700/167 |
| 5,315,523 | 5/1994 | Fujita et al. | 364/474.22 |
| 5,480,342 | 1/1996 | Bannayan et al. | 451/8 |
| 5,663,886 | 9/1997 | Lueck | 700/184 |
| 5,694,821 | 12/1997 | Smith | 700/188 |
| 5,746,644 | 5/1998 | Cheetham | 451/6 |
| 5,828,992 | 10/1998 | Kusmierczyk | 704/8 |

*Primary Examiner*—William Grant
*Assistant Examiner*—Kidesf Bahta
*Attorney, Agent, or Firm*—Cummings & Lockwood

[57] ABSTRACT

An improved monitoring system for a band saw has at least one position sensor, a controller, and a computer including a data storage device and a display monitor linked to the controller. The system may be used with new and existing models of band saws to provide real-time data relating to feed rate and band speed during the time the saw blade is in cutting engagement with a workpiece. A machine operator utilizes the data to optimize the operation of the band saw as it proceeds through a series of cutting operations.

20 Claims, 4 Drawing Sheets

Machine Monitor

BLADE NAME:     OPERATOR:     DATE:  
T.P.I.:     BLADE #:     TIME:     TOTAL SQUARES: 86.4

| CUT # | DATE/FAILURE | WO# | GRADE | SIZE | AREA(A) CUT SQ | BAND SPD | TRAV (DPM) | START | STOP | CUT MIN | SQUARES PER MIN |
|---|---|---|---|---|---|---|---|---|---|---|---|
| 13 | 06/05/98 | | 5210 | H4.375 W | 15.03 | 164 | 1.58 | 01:53:57 | 01:56:43 | 2.8 | 5.4 |
| 14 | 06/05/98 | | 5210 | H4.375 W | 15.03 | 164 | 1.54 | 04:45:50 | 04:48:41 | 2.9 | 5.3 |
| 15 | 06/05/98 | | 5210 | H4.375 W | 15.03 | 164 | 1.59 | 04:50:22 | 04:53:07 | 2.8 | 5.5 |
| 16 | 06/05/98 | | 5210 | H4.375 W | 15.03 | 164 | 1.57 | 04:53:13 | 04:56:00 | 2.8 | 5.4 |

FIG. 5

MACHINE TOOL MONITORING SYSTEM

TECHNICAL FIELD

The present invention relates generally to machine tool monitoring systems and, in particular, to an improved machine tool monitoring system comprising at least one position sensor linked to a controller, the system being particularly suitable for data acquisition, performance analysis, and productivity optimization in cutting applications utilizing band saw machines.

BACKGROUND ART

A typical band saw machine of the type to which the invention pertains includes a tool carriage for supporting a saw blade which is driven about a pair of band wheels, and a support bed which supports a workpiece to be cut by the saw. The carriage is moveable toward and away from the support bed to advance the saw blade through the workpiece in a cutting operation and to withdraw the blade from the workpiece when the cutting operation is complete.

Monitoring systems for determining and displaying the feed rate of a band saw blade through a workpiece are known in the art. One such system employs at least two microswitches or limit switches which indicate the beginning and end of the cutting operation. One microswitch is located at a distance from the support bed which corresponds to the carriage position just prior to the point where the saw blade enters the workpiece. A second microswitch is located at the carriage position where the saw blade has cut through the work piece and contacts the support bed. An associated timing device measures the time duration of the cutting operation, and the system calculates the average feed rate of the blade through the workpiece based on the distance between the two switch locations and the measured time duration of the cutting operation.

This system presents a number of drawbacks. First, the system does not provide a real time indication of the feed rate of the saw blade throughout the workpiece. Rather, the operator must wait until the entire cutting operation is complete before the calculated feed rate can be obtained. Second, the system calculates only an average feed rate over the entire cutting operation. Thus, there is no indication of how the feed rate might vary during different portions of the cutting operation in the case, for example, where the workpiece does not present a consistent cross section. Further, the switch location indicating the start of the cutting operation must be continuously moved as workpieces having different profiles are cut by the band saw. This is the case since the distance between the support bed and the point where the saw blade initially engages the workpiece will likely change as the profiles of the workpieces change.

In an alternative system, a retractable wire spool is mounted on the tool carriage with the wire extending between the carriage and the support bed. The spool is linked to a quadrature encoder, and as the carriage moves toward the support bed during a cutting operation and the wire spool retracts, the encoder translates the movement of the carriage as displacement of the wire. Data signals representing the relative position of the carriage with respect to the workbed are fed to an associated rate meter which determines the feed rate of the saw blade through the workpiece based on the data provided by the encoder. The rate meter provides a visual display of the feed rate to a machine operator. This system does not record the feed rate, but simply displays the feed rate as the cutting operation proceeds. Thus, in order to determine the feed rate the operator must continuously observe the output of the rate meter throughout the actual cutting operation. The operator can adjust the operation of the machine based on the rate that is observed, but any adjustments are the result of completely manual feedback by the operator. No data is recorded and, therefore, no continuous real-time summary of the cutting operations performed by the band saw are provided. Thus, the operator cannot analyze the overall performance of the saw over a series of cutting operations to optimize productivity.

Accordingly, an improved band saw monitoring system would provide the following capabilities. The monitoring system would continuously calculate the relative position of the cutting blade with respect to the workpiece during the cutting operation and the direction of movement of the blade within, toward or away from the workpiece. Based on this data, the system would continuously determine the feed rate of the blade throughout the cutting operation. The system would also accurately determine the time duration of each cutting operation and provide an average feed rate for the entire cutting operation. The system would also determine the running speed of the cutting blade, i.e., the rate at which the saw blade is advanced around the band wheels. To optimize productivity and reduce premature blade failure, the system would provide a real-time display of the measured parameters to a machine operator for comparison with optimum values. The system would also preserve the measured data for future analysis.

It is, therefore, an object of the present invention to provide an improved machine monitoring system for a band saw which overcomes the above-described drawbacks and disadvantages of the prior art while providing the aforementioned capabilities.

SUMMARY OF THE INVENTION

The present invention provides a monitoring system for a band saw of the type having a support bed for supporting a workpiece and a tool carriage which supports a band saw blade driven in a direction transverse to the workpiece, the tool carriage and support bed being movable relative to one another during a cutting operation. The system may be employed in conjunction with vertical, horizontal or pivot type band saw machines, and with band saw machines of various feed types, including pressure feed band saws, constant traverse feed saws and band saws employing a combination of these feed types.

The monitoring system comprises at least one position sensor, a controller, and a computer including a data storage device and a display unit, such as a PC, linked with the controller. The controller utilizes output signals from the position sensor to continuously calculate both the velocity of the saw blade with respect to the workpiece as the tool carriage and the support bed move relative to one another and the direction of that velocity either toward or away from the workpiece. Based on this data, the controller continuously calculates the feed rate of the saw blade through the workpiece during the period the saw blade is in cutting engagement with the workpiece. The feed rate calculated by the controller is forwarded to the computer and is continuously provided as a real-time display to the machine operator as the cutting operation proceeds. In addition, the computer calculates the average feed rate over the entire cutting operation. The calculated average feed rate is stored by the computer and is displayed to the machine operator for comparison with a predetermined optimum value based on the particular workpiece being cut, the model of band saw performing the cutting operation, and the particular type of saw blade being used. The machine operator compares the calculated average feed rate with the optimum feed rate to control the operation of the band saw and optimize the cutting operation.

In the preferred embodiment of the invention, the position sensor comprises a retractable spool of wire and an associated quadrature encoder having A and B channels which provide square wave outputs. The wave outputs are 90° out of phase with each other, and the phase relationship indicates the direction the wire spool is turning and, accordingly, the direction the carriage is moving with respect to the support bed. The sensor is mounted on either the tool carriage or the support bed with the wire extending between these structures.

In the preferred embodiment, the monitoring system further includes a proximity sensor which provides data signals to the controller representing the band speed, i.e., the speed at which the blade is being driven in a direction transverse to the workpiece. The controller sums the data signals received from the sensor per unit time and forwards this information to the computer. Based on the information provided by the controller, the computer calculates the actual band speed. The calculated value is stored by the computer and is provided as a real-time display to the machine operator for comparison with a predetermined optimum band speed. Preferably, at the conclusion of the cutting operation, the system displays the average feed rate and the predetermined optimum feed rate, as well as the calculated band speed and the optimum band speed for immediate comparison by the machine operator.

Other advantages of the present invention will become apparent in view of the following detailed description and the accompanying drawings.

BRIEF DESCRIPTION OF THE DRAWINGS

The invention will now be described by way of example with reference to the drawings in which:

FIG. 5 is a real-time screen display generated by the monitoring system illustrated in FIG. 3 indicating operating parameters of the cutting operation performed by the band saw.

DETAILED DESCRIPTION OF THE PREFERRED EMBODIMENT

Figure 1:
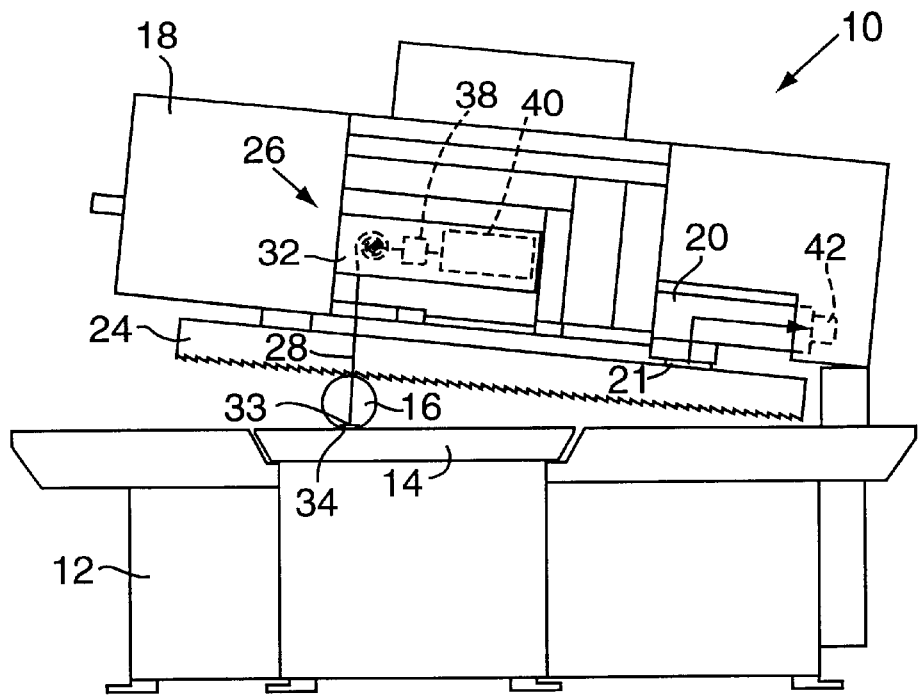
FIG. 1 is a schematic illustration of a pivot-type band saw machine with the pivot arm of the saw in the raised position.

A pivot-type band saw machine incorporating a monitoring system embodying the invention is illustrated in FIGS. 1–4. The band saw machine, generally designated 10, includes a work table 12 defining a support bed 14 for supporting a workpiece, such as the illustrated round metal bar 16. The band saw further includes a pivot arm or tool carriage 18 pivotally mounted on the work table 12 for movement relative to the support bed 14 during a cutting operation between a raised position (shown in FIGS. 1 and 3) and a lowered position (shown in FIGS. 2 and 4). A drive motor 20 is mounted on the pivot arm and is coupled by an output shaft 21 to a driven band wheel 22 which also forms a part of the drive assembly. An endless band saw blade 24 is looped around the driven band wheel 22 and an associated idler band wheel 25 which is also mounted on the pivot arm. The drive motor 20 advances the saw blade 24 around the band wheels 22 and 25 in a direction transverse to the workpiece (indicated by arrow A) under the automatic control of a machine operator.

Figure 2:
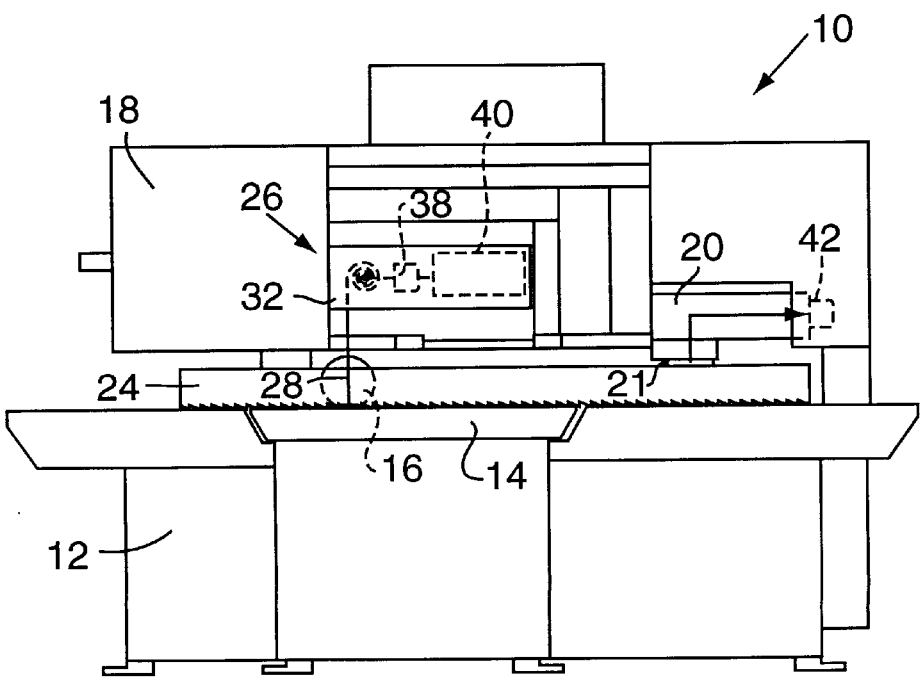
FIG. 2 is a schematic illustration of the band saw of FIG. 1 with the pivot arm in the lowered position.
Figure 3:
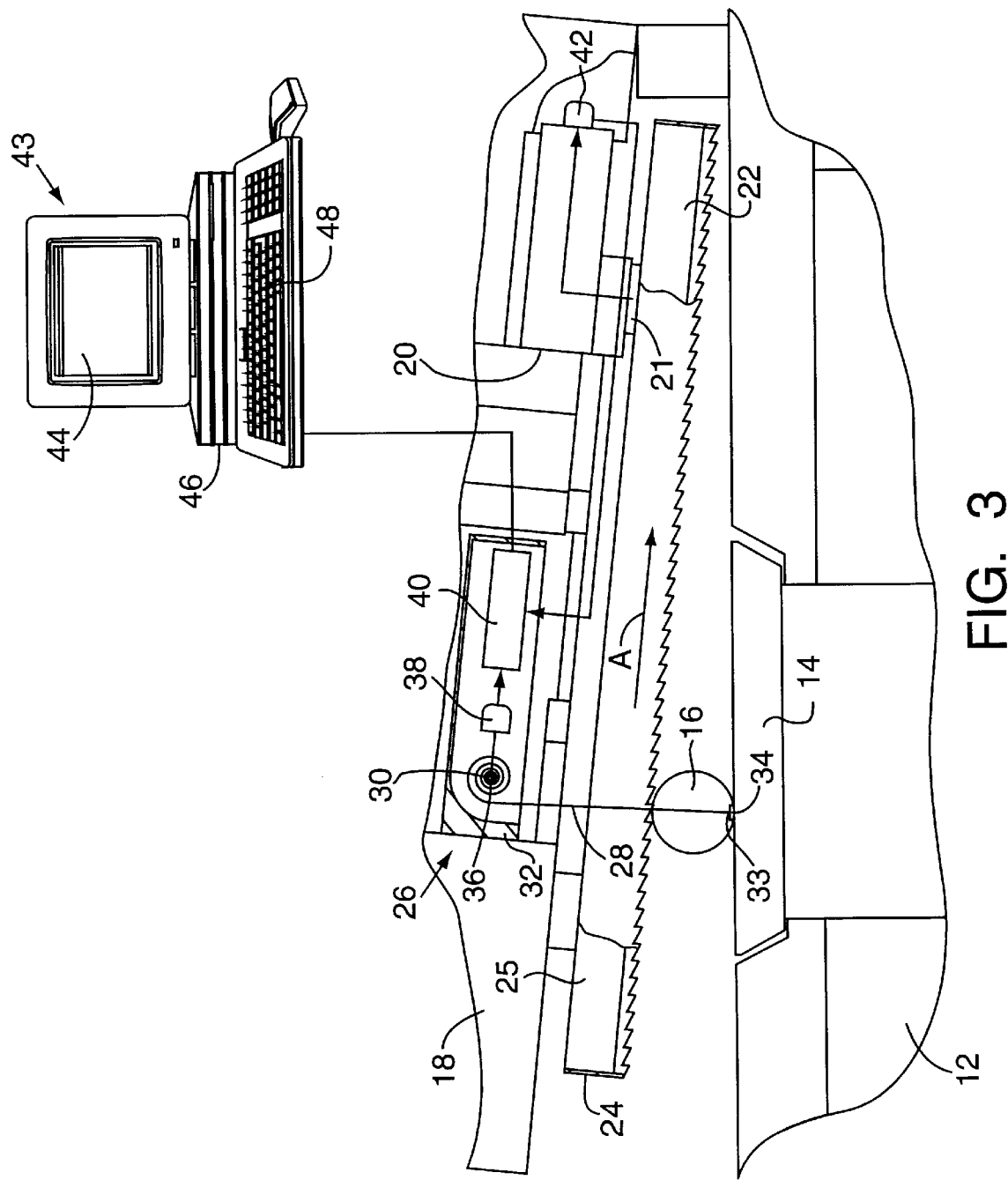
FIG. 3 is a partially cut away side view of the band saw of FIG. 1 with the pivot arm of the saw in the raised position and including a monitoring system embodying the invention.
Figure 4:
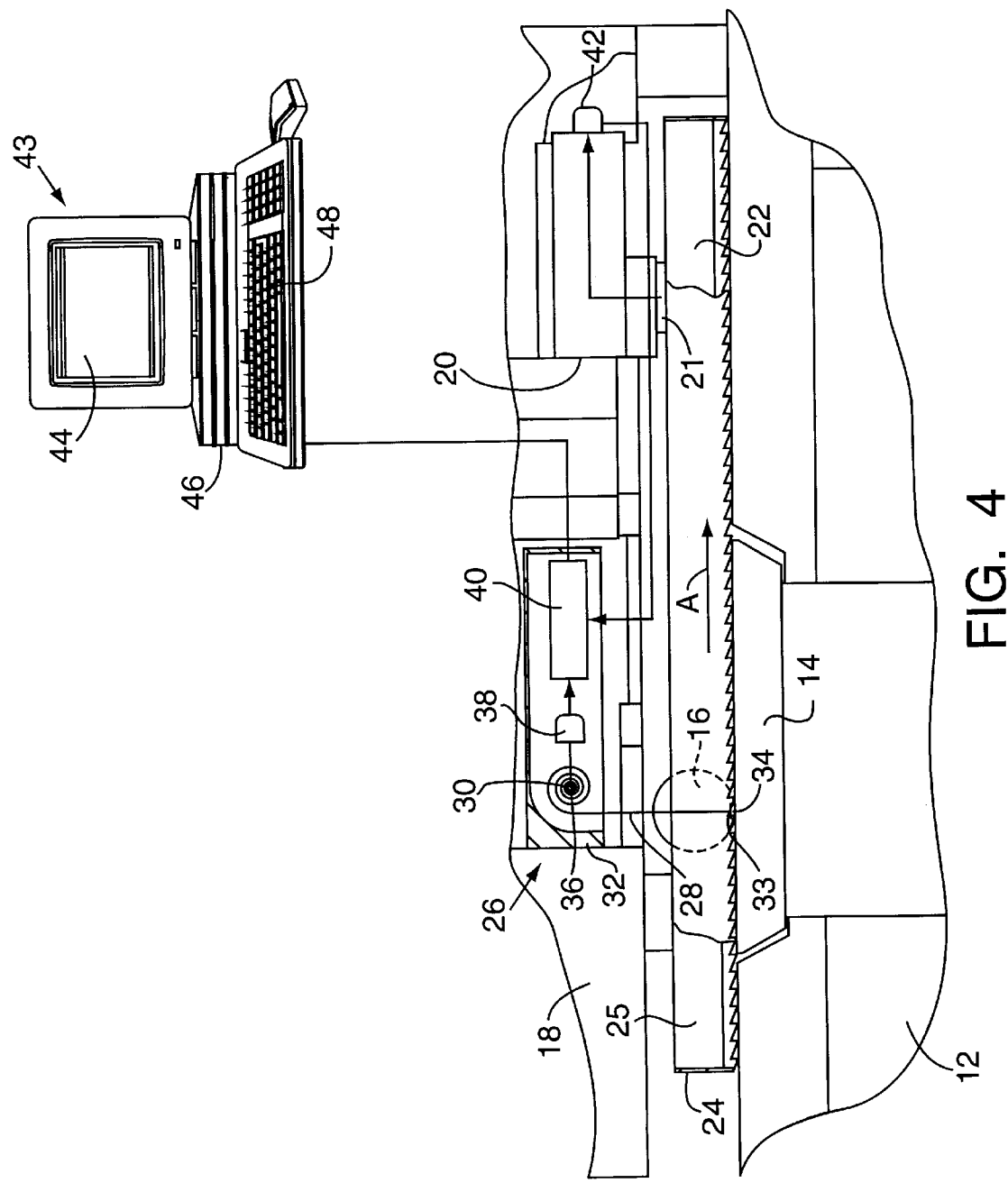
FIG. 4 is a partially cut away side view of the band saw of FIG. 1 with the pivot arm of the saw in the lowered position.

As shown in FIGS. 1 and 3, when the pivot arm is in the raised position, the saw blade 24 is disposed immediately adjacent to the top of the work piece 16. Accordingly, the raised position corresponds to the position of the pivot arm 18 and the saw blade 24 at the start of a particular cutting operation. As shown in FIGS. 2 and 4, when the pivot arm is in the lowered position, the saw blade 24 has completely cut through the workpiece 16. Thus, the lowered position corresponds to the position of the pivot arm and the saw blade at the completion of the cutting operation. The machine operator automatically controls the movement of the pivot arm 18 between the raised and lowered positions to bring the saw blade 24 into and out of cutting engagement with the workpiece 16.

Referring in particular to FIG. 3, the monitoring system comprises a position sensor 26 which is mounted on the pivot arm 18. The sensor provides signals representing the changing position of the saw blade 24 as the carriage is moved between the raised and lowered positions, and the direction of movement of the saw blade either toward or away from the support bed. As shown in FIG. 3, the position sensor 26 comprises a spool of wire 28 mounted on a shaft 30 within a housing 32. The free end 33 of the wire is releasably attached to the support bed 14 by a suitable coupling 34. As the pivot arm moves to the raised position, the wire spool unwinds, and as the pivot arm moves to the lowered position a band spring 36 connecting the spool to the shaft 30 causes the spool to retract. Thus, the spool of wire 28 unwinds and retracts in accordance with the movement of the pivot arm 18 between the raised and lowered positions.

The sensor 26 further includes a quadrature encoder 38 which is linked directly to the shaft 30, as shown in FIG. 3. The encoder provides output signals based on the rotational position of the shaft 30 as the spool unwinds and retracts. Thus, the encoder translates the arcuate movement of the pivot arm 18 as displacement of the wire 28. As noted previously, the output signals of the encoder are of the quadrature type having A and B channels which provide square wave outputs. The wave outputs are 900 out of phase with each other, and the phase relationship indicates the direction the wire spool is turning and, accordingly, the direction the carriage is moving with respect to the support bed. Thus, these signals represent not only the relative position of the band saw blade 24 as the pivot arm 18 is moved between the raised and lowered positions, but also represent the direction of movement of the saw blade toward or away from the bed.

It will be appreciated by those skilled in the art that the encoder need not be linked directly to the shaft 30. Instead, the encoder may be linked to a pulley over which the wire 28 extends. As the wire unwinds and retracts in response to the movement of the pivot arm 18 the pulley is rotated accordingly, and the encoder generates output signals based on the rotational position of the pulley.

Output signals from the encoder 38 are continuously fed to a controller 40 which is also mounted within the housing 32. The controller sums the output signals from the encoder and continuously calculates the velocity of the saw blade 24 with respect to the support bed 14 as the pivot arm 18 moves between the raised and lowered positions. In order to maximize the accuracy of the velocity calculation, the wire 28 is coupled to the support bed in alignment with the center of the workpiece 16 as shown in FIGS. 1–4.

The controller also continuously tracks the direction the blade is moving either toward or away from the workpiece based on the phase relationship between the output channels A and B of the encoder. A phase reversal in the outputs of the channels provides a precise and instantaneous indication that the direction of the velocity of the saw blade with respect to the workpiece has changed. A change in direction occurs when the saw blade 24 has cut through the workpiece 16 and the pivot arm 18 begins moving from the lowered position to the raised position. A change in direction also occurs at the start of the cutting operation when the pivot arm 18 begins moving from the raised position to the lowered position. Thus, the output signals of the encoder provide a precise indication of the beginning and end of the cutting operation and, accordingly, an accurate measurement of the time duration of the cutting operation.

The system continuously monitors the feed rate throughout the entire cutting operation. The controller 40 is linked to a computer, such as PC 43, which includes a monitor 44, a data storage device 46 and a keyboard 48 through which the machine operator interacts with the system. As each cutting operation proceeds, the feed rate calculated by the central processor 40 is continuously displayed on the monitor 44. At the end of each cutting operation, the average feed rate over the entire cutting operation is calculated by the computer and is displayed on the monitor and also stored in the data storage device 46.

It should therefore be apparent that the encoder outputs serve the same purpose as the microswitches used in prior art monitoring systems. Substituting the quadrature encoder for the microswitches obviates the need to reposition the switches each time a workpiece having a different profile is cut by the band saw. As noted previously, this is one of the primary disadvantages of the prior system. It should also be appreciated that, as discussed previously, while quadrature encoders have been used in the past in conjunction with rate meters to determine the feed rate of band saw machines, the prior art did not link the encoder to a controller to determine the direction of movement of the tool carriage and, accordingly, permit a precise calculation of the duration of the cutting operation. Further, the prior art systems did not employ a controller linked to a computer including data storage and a display unit to record and provide a real-time display of the feed rate to the machine operator.

The monitoring systems further comprises a proximity sensor 42 linked to a moving component of the band saw machine that represents band speed. In the illustrated embodiment, the proximity sensor 42 is shown linked to the output shaft 21 of the drive motor 20. However, those skilled in the art will recognize that the proximity sensor could, for example, be linked to the band wheel 22. The sensor 42 continuously provides data signals to the controller 40 based on the rotational position of the motor shaft 21. The controller sums the data signals per unit time, typically the data signals provided by the sensor 42 per second, and forwards the summed value to the PC.

To determine the actual band speed during a cutting operation, the PC multiplies the number of data signals received per unit time by a scale factor. The scale factor is calculated during the initial set up of the monitoring system by operating the band saw machine at maximum band speed and relating the number of data signals per unit time at maximum band speed to the number of data signals obtained from the controller. The scaling operation is based on the particular configuration of the band saw machine's drive components and the position of the proximity sensor 42. For example, in the drawings sensor 42 is shown connected to motor shaft 21 and the shaft is shown directly connected to band wheel 22. However, as is well-known to those skilled in the art, the motor shaft is typically connected to band wheel 22 through a gear train or pulley which controls the rotational speed of the band wheel 22 with respect to the rotational speed of the motor shaft. Since the monitoring system of the present invention can accommodate various arrangements of different drive components, the position of the proximity sensor can vary depending on the particular band saw machine model and type with which the monitoring system is used.

The band speed is displayed real-time on the monitor 44 and is typically captured at a predetermined time after the cutting operation has begun and recorded in the data storage device 46. Accordingly, the machine operator can compare both the calculated average feed rate and the calculated band speed with predetermined optimum values for these parameters. The optimum values are provided by known software programs which specify feed rate, band speed and blade type based on the size, shape and material composition of the workpiece and the particular model of band saw machine performing the cutting operation. One such program is available from American Saw and Mfg. Co. under the trademark SAWCALC®. By comparing the calculated values to the optimum values, the machine operator can immediately determine if the cutting operation is proceeding at optimum efficiency and, if not, the band speed and feed rate should be adjusted to insure maximum productivity and blade life. Moreover, the machine operator can utilize the continuous real-time display of the feed rate and band speed to adjust these parameters while a particular cutting operation is proceeding. This is a particular advantage when cutting workpieces which do not present a consistent cross-section, such as the metal bar 16.

A typical screen display provided on the monitor 44 is shown in FIG. 5. A display header provides general information including the current date and time, the name of the machine operator, and information regarding the particular saw blade being used, including the a blade identification number and the tooth pitch (T.P.I.) of the blade. The header also indicates the total square inches of material (Total Squares) cut by the identified saw blade as calculated by summing the area of material cut in each individual cutting operation. Operating information for each cut made in the workpiece is displayed in a separate row below the header. As shown in FIG. 5, each row includes a series of fields arranged in columns indicating the cut number, the date the cut was actually made and whether blade failure occurred on that particular cut. It should be noted that the failure message will appear in this column for the cut following the cut on which the actual failure occurred. Separate fields are provided for the work order number, the grade and size of the workpiece and the cross-sectional area of the workpiece. It should also be noted that with respect to the size of the workpiece, if no entry is made in field W then the part has a round cross section.

Separate fields are also provided for feed rate (TRAV) and band speed. As noted previously, the band speed is displayed real-time on the monitor 44 and is typically captured at a predetermined time after the cutting operation has begun and recorded in the data storage device 46. The display further provides the start and stop time of each cut, the time duration of each cut and the average square inches cut per minute.

As shown in FIG. 5, the monitor 44 provides a real-time display of an entire series of cutting operations so that the machine operator can continuously analyze the performance of the band saw and adjust the cutting parameters to maximize production. As noted above, the operator performs the analysis by comparing the calculated band speed and average feed rate values with the predetermined optimum values which may be retrieved from data storage or which may be displayed in a separate field on the monitor.

Another advantage provided by the invention is that existing models of band saw machines can be easily retrofitted with the monitoring system. The housing 32 including the spool of wire 28, the quadrature encoder 38, and the controller 40 can be mechanically attached or even magnetically attached to any band saw machine. The coupling 34 is then simply mounted to the support bed and the wire extended from the spool to the coupling. The cable connections are made to the encoder 38 and to a suitable PC, such as the PC 43. To complete the system, the proximity sensor 42 is mounted in the machine and linked to the controller. As noted previously, the position of the sensor 42 is machine independent. Thus, the system is universally adaptable to any new or existing band saw model.

As will be recognized by those skilled in the pertinent art, numerous modifications may be made to these and other embodiments of the present invention without departing from the scope of the invention as defined in the claims. For example, a real-time display of the feed rate is preferably provided by the controller as well as the display monitor. Moreover, the proximity sensor could be linked to the driven band wheel instead of the motor shaft, or the spool of wire could be mounted on the support bed and the free end of the wire coupled to the pivot arm. Further, since the system determines and records the start and stop time for each cutting operation, the non-cutting time between cutting operations can also be quantified and recorded.

Accordingly, the detailed description of the embodiments set forth above must be taken in an illustrative rather than a limiting sense.

What is claimed is:

1. A monitoring system for a band saw machine of the type having a support bed for supporting a workpiece and a tool carriage which supports a band saw blade driven in a direction transverse to the workpiece, wherein at least one of the tool carriage and support bed is movable relative to the other, and the saw blade is driven relative to the workpiece during a cutting operation, said monitoring system comprising:

at least one position sensor mounted on at least one of the tool carriage and the support bed for providing output signals representing the relative position of the band saw blade with respect to the support bed and the direction of movement of the saw blade relative to the support bed during the cutting operation;

a processor coupled to the at least one position sensor for receiving the output signals provided by the position sensor and continuously calculating the feed rate of the saw blade with respect to the support bed and continuously tracking the direction of movement of the saw blade toward or away from the support bed;

a data storage device coupled to the at least processor for storing data representing the feed rate calculated by the controller; and a display unit for providing a real-time display of the calculated feed rate.

2. The monitoring system of claim 1, wherein the position sensor comprises:

a retractable spool of wire mounted on one of the tool carriage and the support bed with the wire extending therebetween, the wire having a free end coupled to the other of the tool carriage and support bed, wherein the wire spool unwinds and retracts in accordance with the movement of the tool carriage and the support bed relative to one another; and a quadrature encoder having quadrature outputs associated with the retractable spool for translating the movement of the tool carriage and the support bed relative to one another as displacement of the wire as the spool unwinds and retracts in accordance the movement and for representing the direction of movement of the tool carriage and support bed relative to one another.

3. The monitoring system of claim 2, wherein the display unit further provides a display of the average feed rate for the cutting operation and an optimum feed rate for the cutting operation.

4. The monitoring system of claim 1, further comprising:

a proximity sensor for providing data signals representing the speed at which the blade is being driven about the band wheels, wherein the processor sums the data signals provided by the proximity sensor per unit time and calculates the actual band speed based on the sum of the data signals.

5. The monitoring system of claim 4, wherein the calculated band speed is stored together with an optimum band speed and wherein the display unit provides a real-time display of both the calculated and the optimum band speeds.

6. The monitoring system of claim 5, wherein the data storage device stores the calculated average feed rate, the calculated band speed, the optimum average feed rate and the optimum band speed for a plurality of cutting operations and the display unit provides a real-time display of the calculated and optimum feed rates and band speeds.

7. The monitoring system of claim 6, wherein the processor calculates the time duration of the cutting operation.

8. A method for monitoring the performance of a band saw machine of the type having a support bed for supporting a workpiece and a tool carriage which supports a band saw blade driven in a direction transverse to the workpiece, the tool carriage and support bed being movable relative to one another and the saw blade being driven relative to the workpiece during a cutting operation, said method comprising the steps of:

a) providing data representing the relative position of the band saw blade with respect to the support bed during the cutting operation;

b) providing data representing the direction of movement of the saw blade relative to the support bed during the cutting operation;

c) continuously calculating the feed rate of the saw blade through the workpiece when the blade is in cutting engagement with the workpiece based on the data;

d) continuously tracking the direction of movement of the tool carriage and support bed relative to one another;

e) providing a real-time display of the calculated feed rate as the cutting operation proceeds, and a calculated average feed rate for the entire cutting operation;

f) providing an optimum feed rate for the saw blade when it is in cutting engagement with the workpiece; and g) comparing the calculated average feed rate to the optimum feed rate to determine if these rates differ.

9. The method of claim 8 further comprising the step of:

h) adjusting the operation of the band saw so that the calculated average feed rate equals the optimum feed rate.

10. The method of claim 9 further including the steps of:

i) calculating the band speed of the saw blade during the period the blade is in cutting engagement with the workpiece;

j) providing an optimum band speed for the blade during this period;

k) providing a real-time display of the calculated band speed;

l) comparing the calculated band speed and the optimum band speed to determine if these speeds differ; and m) adjusting the operation of the band saw so that the calculated band speed equals the optimum band speed.

11. The method of claim 10, wherein steps a)–m) are repeated for a plurality of cutting operations.

12. The method of claim 10 wherein steps f) and j) are further characterized in that the optimum feed rate and band speed, respectively, are simultaneously displayed.

13. The method of claim 10, further including the step of calculating the duration of each cutting operation based on changes in the direction of movement of the tool carriage and support bed relative to one another.

14. The method of claim 10, further including the step of calculating the time between cutting operations based on changes in the direction of movement of the tool carriage and support bed relative to one another.

15. A monitoring system for a band saw machine of the type having a support bed for supporting a workpiece and a tool carriage which supports a band saw blade driven in a direction transverse to the workpiece, wherein at least one of the tool carriage and support bed is movable relative to the other, and the saw blade is driven relative to the workpiece during a cutting operation, said monitoring system comprising:

first means mounted on at least one of the tool carriage and the support bed for providing output signals representing the relative position of the band saw blade with respect to the support bed and the direction of movement of the saw blade relative to the support bed during the cutting operation;

second means coupled to the first means for receiving the output signals provided by the first means and continuously calculating the feed rate of the saw blade with respect to the support bed and continuously tracking the direction of movement of the saw blade toward or away from the support bed;

third means coupled to the second means for storing data representing the feed rate calculated by the second means; and fourth means for providing a real-time display of the calculated feed rate.

16. A monitoring system as defined in claim 15, wherein the first means comprises a position sensor including a retractable spool of wire mounted on one of the tool carriage and the support bed with the wire extending therebetween, wherein the wire spool unwinds and retracts in accordance with the movement of the tool carriage and the support bed relative to each other; and an encoder coupled to the retractable spool for generating output signals indicative of the displacement of the wire as the spool unwinds and retracts in accordance with movement of at least one of the tool carriage and support bed relative to the other and indicative of the direction of movement of at least one of the tool carriage and support bed relative to the other.

17. A monitoring system as defined in claim 15, wherein the third means includes a data storage device.

18. A monitoring system as defined in claim 15, wherein the fourth means includes an electronic display.

19. A monitoring system as defined in claim 15, further comprising means for providing data signals representing the speed at which the band saw blade is being driven about the band wheels, and wherein the second means is coupled thereto and sums the data signals per unit time and calculates the actual band speed based on the sum of the data signals.

20. A monitoring system as defined in claim 1, comprising a controller including the processor, and a computer including the data storage device.

* * * * *

UNITED STATES PATENT AND TRADEMARK OFFICE
CERTIFICATE OF CORRECTION

PATENT NO.    : 6,167,324
DATED         : December 26, 2000
INVENTOR(S)   : Paul William Gorman It is certified that error appears in the above-identified patent and that said Letters Patent is hereby corrected as shown below:

Column 7,
Line 65, delete the words "at least" before "processor";
Line 67, please delete "controller" and insert in its place -- processor --.

Column 8,
Line 16, after "in accordance" and before "the movement" please insert -- with --.

Signed and Sealed this

Twelfth Day of November, 2002

*Attest:*

JAMES E. ROGAN
*Director of the United States Patent and Trademark Office*

*Attesting Officer*